United States Patent
Hendrix (10) Patent No.: US 12,268,217 B2
(45) Date of Patent: Apr. 8, 2025

(54) METHOD FOR PROCESSING BEEF

(71) Applicant: NSC Beef Processing, LLC, Baird, TX (US)

(72) Inventor: Gary Steven Hendrix, Abilene, TX (US)

( * ) Notice: Subject to any disclaimer, the term of this patent is extended or adjusted under 35 U.S.C. 154(b) by 673 days.

(21) Appl. No.: 17/485,809

(22) Filed: Sep. 27, 2021

(65) Prior Publication Data

US 2022/0030892 A1 Feb. 3, 2022

Related U.S. Application Data (63) Continuation-in-part of application No. 16/945,980, filed on Aug. 3, 2020, now Pat. No. 11,297,844.

(51) Int. Cl.
*A22B 7/00* (2006.01)
*A22B 5/00* (2006.01)
*A22C 15/00* (2006.01)

(52) U.S. Cl.
CPC .......... *A22B 5/0076* (2013.01); *A22B 5/0029* (2013.01); *A22B 7/002* (2013.01); *A22C 15/003* (2013.01)

(58) Field of Classification Search
CPC ...... A22C 15/003–005; A22C 17/0006; A22C 17/0093; A22C 17/02; A22B 5/0029;
(Continued)

(56) References Cited

U.S. PATENT DOCUMENTS 699,815 A * 5/1902 Riddick
2,519,931 A * 8/1950 Roschen ................. A23L 13/76
426/418
(Continued)

FOREIGN PATENT DOCUMENTS

AU 2282977 A 8/1977
CN 111587906 A 8/2020
(Continued)

OTHER PUBLICATIONS

Meat Technology Update Newsletter, Tenderstretch, Jan. 4, p. 1-4 (Year: 2004).*

(Continued)

*Primary Examiner* — Drew E Becker
(74) *Attorney, Agent, or Firm* — LAUBSCHER & FRETWELL, P.C.

(57) ABSTRACT

A method for processing beef includes the steps of preparing a beef carcass for butchering, reducing the carcass temperature by 20 degrees Fahrenheit, removing primal cuts from the carcass, cooling the primal cuts to 32-34 degrees Fahrenheit, and packaging the primal cuts. To prepare the beef carcass, the head of the cattle is removed and the carcass is eviscerated. The carcass is then cooled for approximately three to four hours to lower its temperature to 75-85 degrees in preparation of removing the primal cuts. After this, the carcass is arranged on a butchering device and the primal cuts are removed. The cuts are then packaged and placed in a cooler for approximately 60 minutes to reduce their temperature to 32-34 degrees Fahrenheit, at which time they are prepared for distribution. The entire beef processing method, from kill floor to packaging and cooling, will be complete within 24 hours.

9 Claims, 6 Drawing Sheets

(58) Field of Classification Search
CPC ......... A22B 5/0076; A22B 5/00; A22B 7/002;
A22B 5/0052; A22B 5/0017–0058; A22B
7/003–005; A22B 7/008; A22B 5/06
USPC .................................................. 452/148–171
See application file for complete search history.

(56) References Cited

U.S. PATENT DOCUMENTS

| | | | | |
|---|---|---|---|---|
| 2,874,060 | A * | 2/1959 | Turner | A23L 13/65 |
| | | | | 426/524 |
| 3,657,770 | A * | 4/1972 | Wallace | A22B 7/003 |
| | | | | 452/53 |
| 3,701,847 | A | 10/1972 | Miyauchi et al. | |
| 3,774,264 | A * | 11/1973 | Anderson | A22C 15/00 |
| | | | | 452/187 |
| 3,916,484 | A * | 11/1975 | Kennedy | A22B 5/0058 |
| | | | | 452/159 |
| 4,028,774 | A * | 6/1977 | Allan | A23B 4/064 |
| | | | | 426/418 |
| 4,066,798 | A * | 1/1978 | Follett | B65B 25/067 |
| | | | | 426/414 |
| 4,602,403 | A * | 7/1986 | Martin | A22C 21/0053 |
| | | | | 452/188 |
| 4,615,176 | A * | 10/1986 | Tippmann | A22B 5/0076 |
| | | | | 62/93 |
| 4,716,624 | A * | 1/1988 | Massey, Jr. | A22C 21/0046 |
| | | | | 452/165 |
| 5,087,222 | A * | 2/1992 | Sterling | A22B 5/161 |
| | | | | 452/187 |
| 5,855,507 | A * | 1/1999 | Fisher | A22B 5/0029 |
| | | | | 452/167 |
| 6,878,052 | B2 * | 4/2005 | Andersson | A01K 11/008 |
| | | | | 452/149 |
| 2003/0153258 | A1 * | 8/2003 | Hendrix | A22B 5/06 |
| | | | | 452/187 |
| 2007/0254579 | A1 * | 11/2007 | Gardner | A22C 15/00 |
| | | | | 452/141 |
| 2010/0048114 | A1 * | 2/2010 | Van Den Nieuwelaar | |
| | | | | A22C 21/003 |
| | | | | 452/148 |
| 2015/0065021 | A1 * | 3/2015 | Kirschbaum | A22B 5/06 |
| | | | | 452/187 |
| 2015/0305351 | A1 * | 10/2015 | Claussen | A23L 13/65 |
| | | | | 426/388 |
| 2016/0073646 | A1 * | 3/2016 | Riley | A23B 4/07 |
| | | | | 452/58 |
| 2018/0303106 | A1 * | 10/2018 | McDonnell | A22C 15/003 |
| 2021/0084946 | A1 * | 3/2021 | Ueno | A23B 4/062 |
| 2023/0292775 | A1 * | 9/2023 | Zhang | F25D 23/006 |
| | | | | 452/141 |

FOREIGN PATENT DOCUMENTS

| | | | | | |
|---|---|---|---|---|---|
| GB | | 345328 | * | 3/1931 | |
| GB | | 2386822 A | * | 10/2003 | A22B 5/00 |
| JP | | 2003164253 A | | 6/2003 | |

OTHER PUBLICATIONS

Hot Boning Disambiguation, Mar. 7, 2012, https://improbable.com/2012/03/07/hot-boning-disambiguation/ (Year: 2012).*

* cited by examiner

METHOD FOR PROCESSING BEEF

This application is a continuation-in-part of the Hendrix U.S. patent application Ser. No. 16/945,980 filed on Aug. 3, 2020, the entire contents of which are incorporated herein by reference.

BACKGROUND OF THE DISCLOSURE

The present disclosure relates generally to a method for processing meat, and more specifically a method for butchering a cattle carcass.

When an animal carcass, such as a cow carcass, is prepared for butchering, typically the carcass is hung by two limbs, the breastbone is cut, the internal organs are removed, and the carcass is split into two halves and cooled. Splitting the carcass both increases the rate of cooling the carcass, which is often necessary to reduce the growth of pathogens, and makes it easier to handle the carcass for butchering. However, this method often causes meat contamination through spinal cord exposure. Further, requiring the carcass be cooled prior to removing primal cuts makes the meat harder and more difficult to debone and puts more stress on butchers. This can result in hand injuries such as carpel tunnel syndrome.

Once the carcass is prepared, all primal cuts are removed. There are multiple methods and devices for supporting and positioning a carcass during this process. Such devices might include, hooks, rib spreaders, and hanging devices, to name a few. For all of these methods, the backbone on the carcass is split as detailed above.

Splitting the backbone may cause contamination through spinal cord exposure. To counteract this, time and money is spent on decontamination methods to ensure that the resultant beef is safe to eat. The results of these methods are often not satisfactory.

Thus, there is a need for a carcass butchering method that removes the risks associated with splitting the backbone of a carcass and increases the speed at which a carcass is cooled to minimize the potential of harmful bacteria.

SUMMARY OF THE DISCLOSURE

Accordingly, it is an object of the present disclosure to provide a method for processing beef, including the steps of preparing a beef carcass for butchering, reducing the carcass temperature by 20 degrees Fahrenheit, removing primal cuts from the carcass, packaging and cooling the primal cuts to 32-34 degrees Fahrenheit, and preparing the packaged primal cuts for distribution. To prepare the beef carcass, the head of the cattle is removed and the carcass is eviscerated. The carcass is then cooled for approximately three to four hours to lower its temperature to 75-85 degrees in preparation of removing the primal cuts. The carcass is then arranged on a butchering device such as the device disclosed in the Hendrix U.S. Patent Application Publication No. 2021/0227838, and the primal cuts are removed. The cuts are then placed in a cooler for approximately 60 minutes to reduce their temperature to 32-34 degrees Fahrenheit. The entire beef processing method, from kill floor to packaging, can be completed within 24 hours.

In one embodiment, preparing a beef carcass for butchering further includes scoring the carcass back without cutting through the carcass backbone or spinal cord, hanging the carcass by a carcass hind portion, removing the hind legs, inserting a hanging device through an opening in the carcass and extending the device through an opening in the carcass neck, inverting the carcass to hang from the hanging device, and removing the forelegs from the carcass.

In another embodiment, at least one of the cooling steps is performed in an environment having a humidity of 84-92% to minimize beef shrinkage.

BRIEF DESCRIPTION OF THE FIGURES

Other objects and advantages of the disclosure will become apparent from a study of the following specification when viewed in the light of the accompanying drawing, in which.

DETAILED DESCRIPTION

Figure 1:
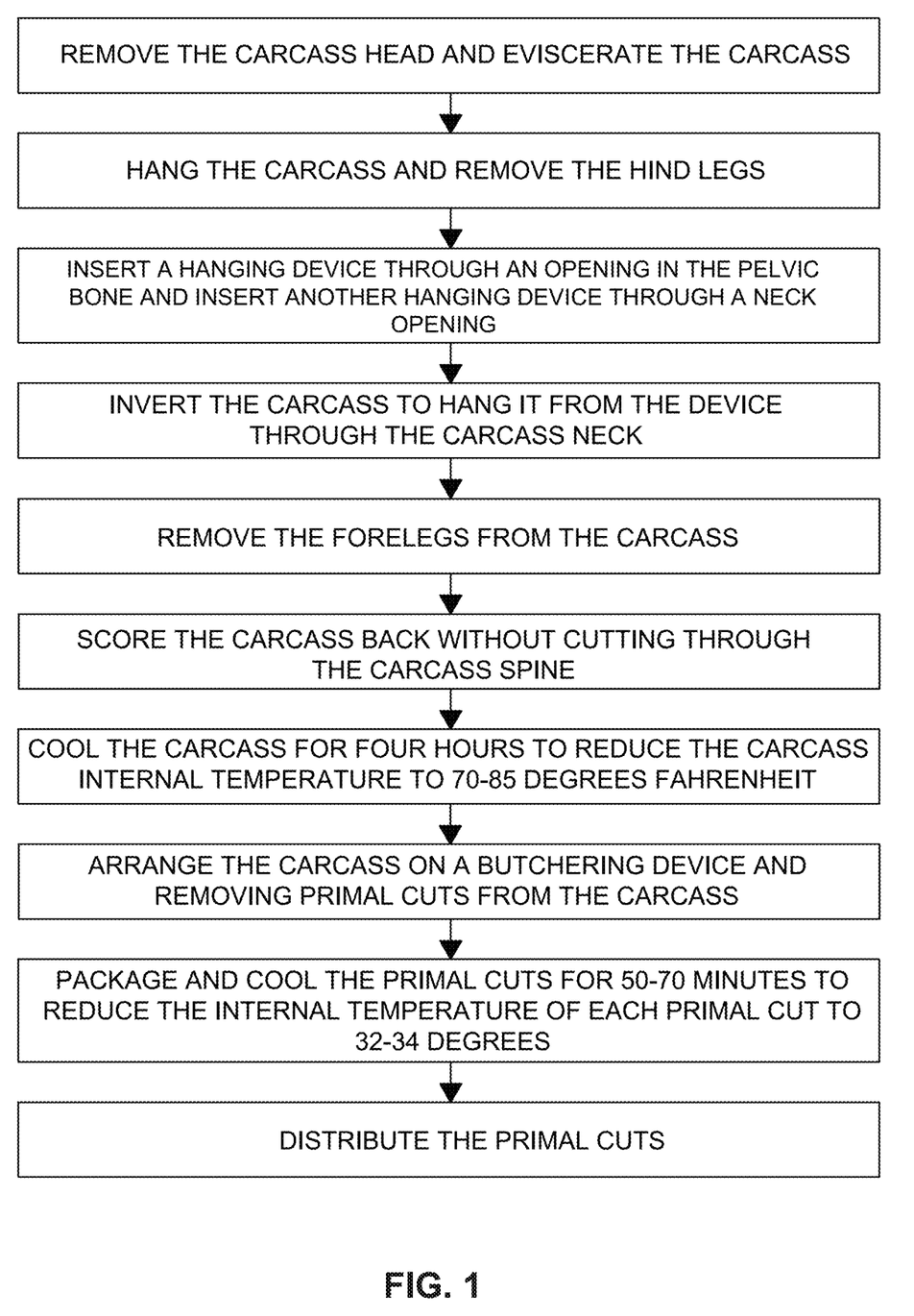
FIG. 1 is a flow chart showing steps for processing beef according to the present disclosure.

The present disclosure relates to a method for processing beef. Referring to FIG. 1, the method includes first removing the cattle head and then eviscerating the carcass so that all internal organs and potential contaminates are separated from the meat that will be processed. Unlike with other butchering methods, the sternum is not split prior to evisceration. The head and organs are then inspected to ensure the cattle carcass is acceptable for human consumption. If it is acceptable, the butchering process continues. At this time, it is expected that the internal temperature of the carcass will be 102-104 degrees Fahrenheit, though that range may vary.

Figures 2, 3:
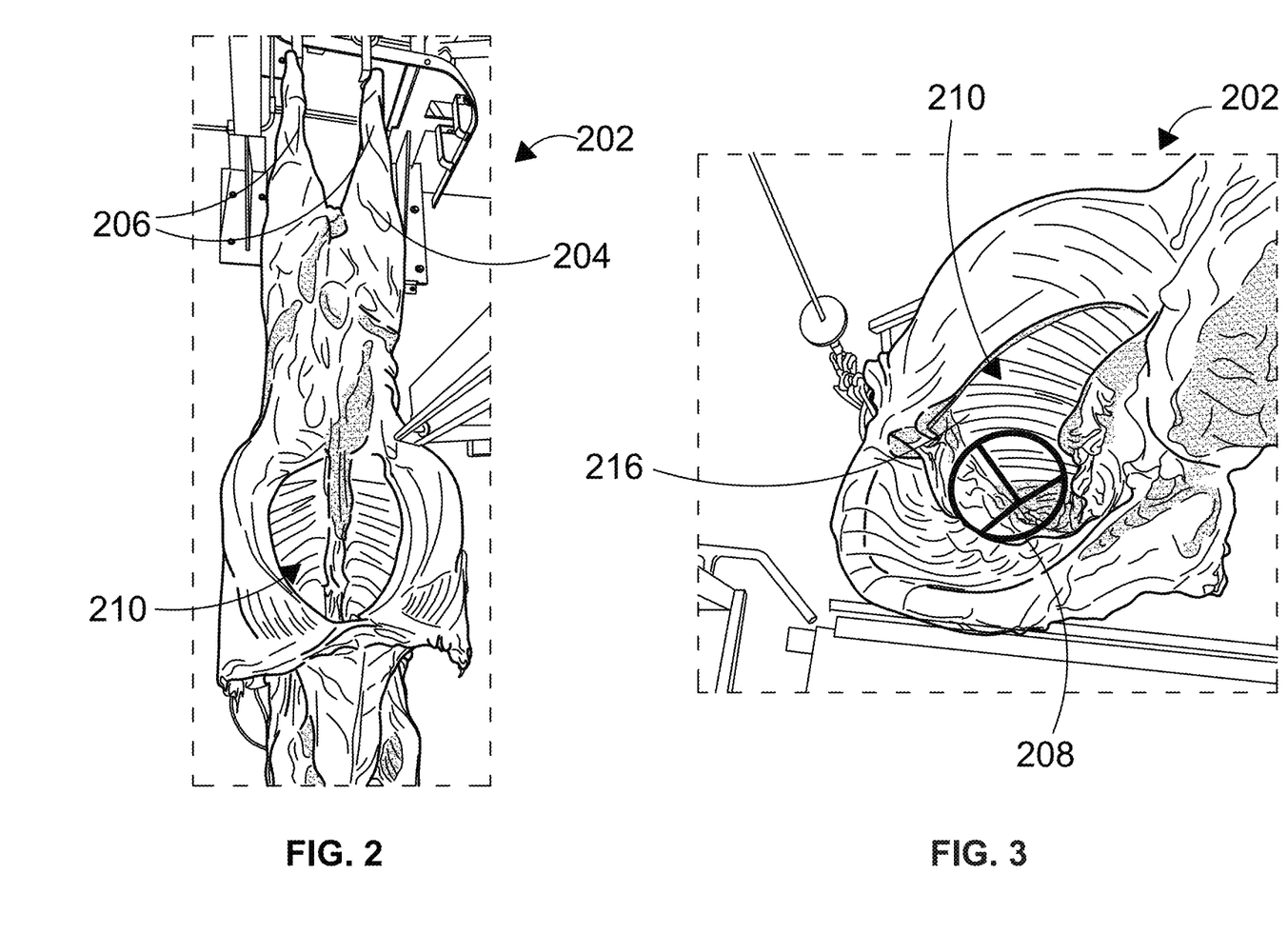
FIG. 2 is a front perspective view of a beef carcass hanging from its hind legs.
FIG. 3 is a top perspective view of a beef carcass hanging from its hind legs with a carcass hanging device inserted in a cavity of the carcass.
Figure 4:
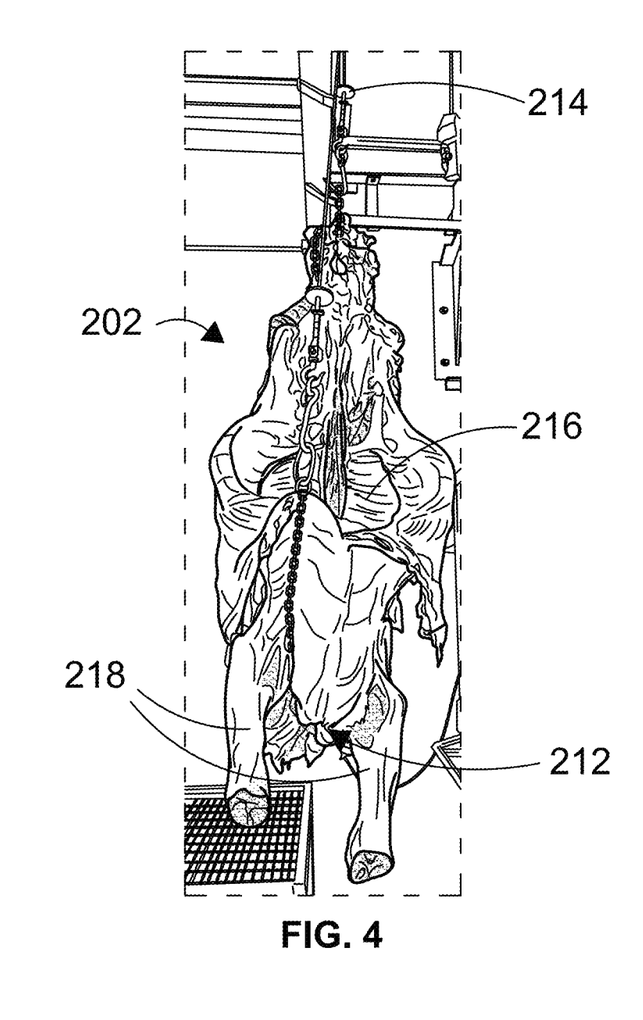
FIG. 4 is a front perspective views of a beef carcass hanging from a hind portion.
Figure 5:
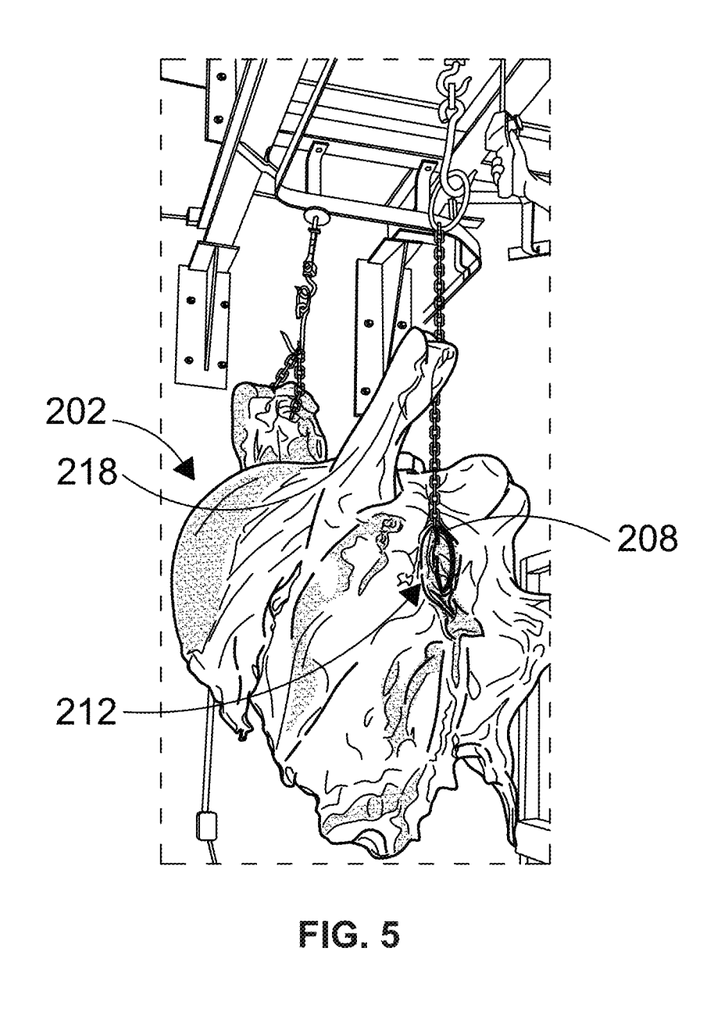
FIG. 5 is a front perspective view of a beef carcass in the process of being inverted according to the present disclosure.
Figure 6:
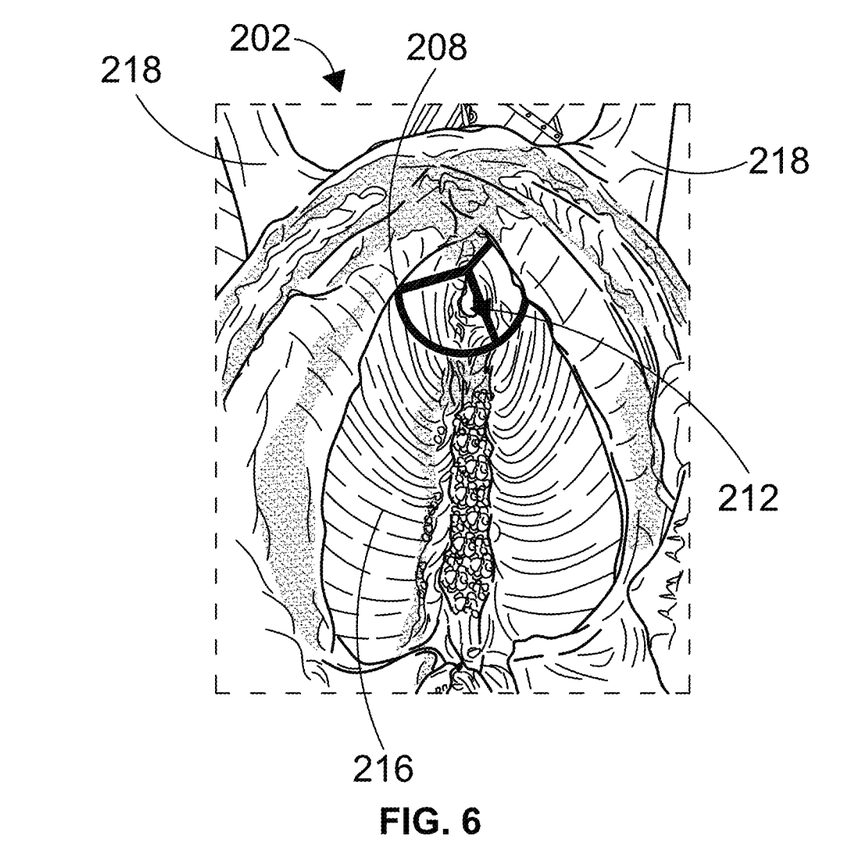
FIG. 6 is a bottom perspective view of a beef carcass hanging from a carcass hanging device.
Figure 7:
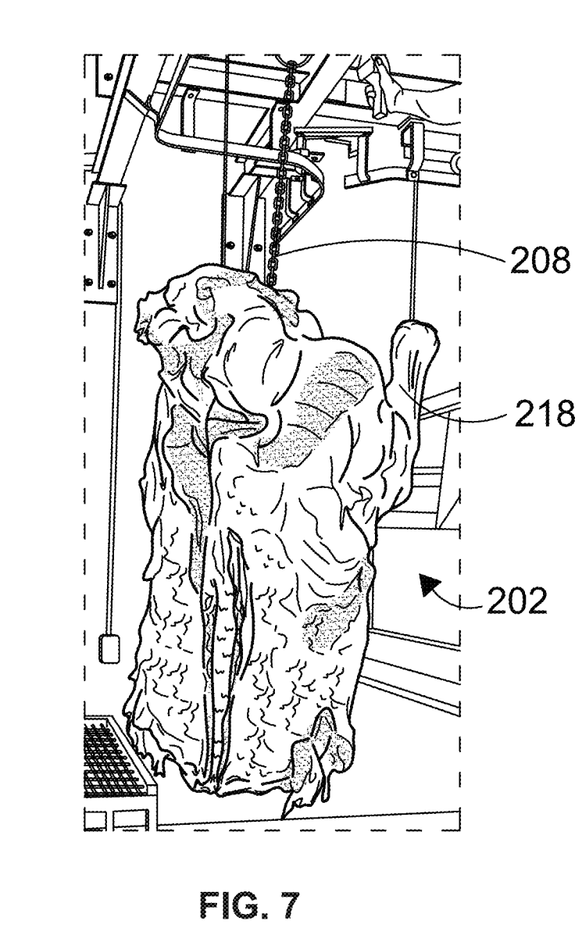
FIGS. 7 and 8 are rear and side perspective views, respectively, of a beef carcass hanging from a carcass hanging device.
Figure 8:
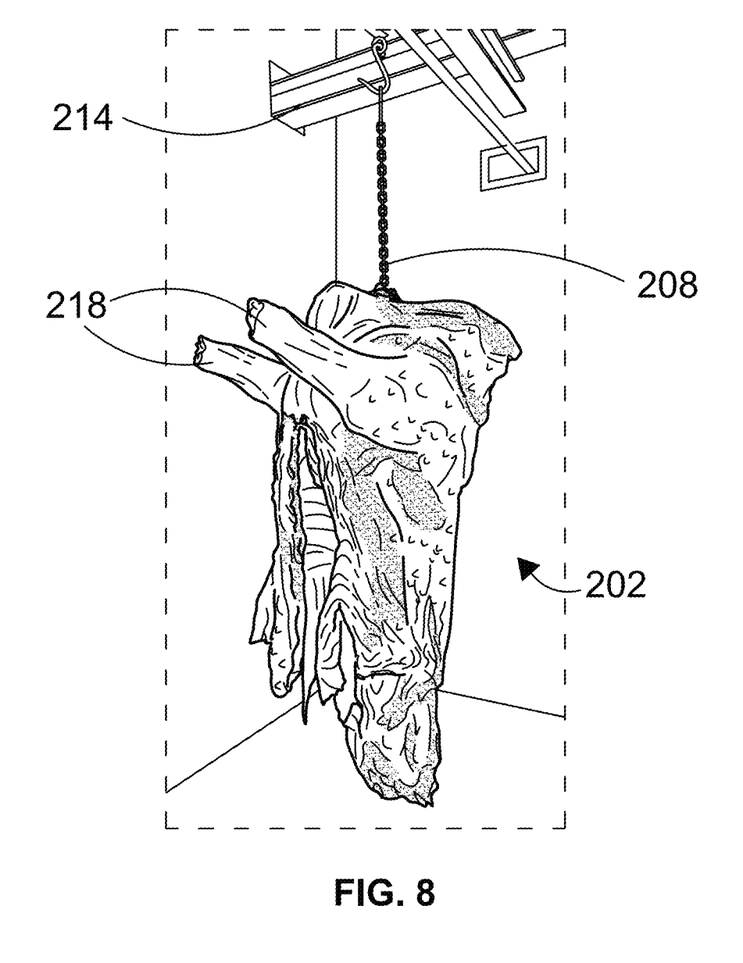

Referring now to FIG. 2, to butcher the carcass according to the present method, the carcass 2 is first hung by its hind portion 4 and then the hind legs 6 are removed. FIGS. 7 and 8 show the carcass being supported by a hanging device 8, such as the one disclosed in the Hendrix '980 application. FIGS. 3 and 4 show the device as it is inserted through a carcass opening 10, extended through a carcass neck opening 12, and hung from a support structure 14, such as a beam. The carcass is then inverted, as shown in FIG. 5, so that it hangs from and is supported by the device 8. FIG. 6 shows the device fully inserted into the carcass and contacting an inner surface 16 of the carcass.

Figure 9:
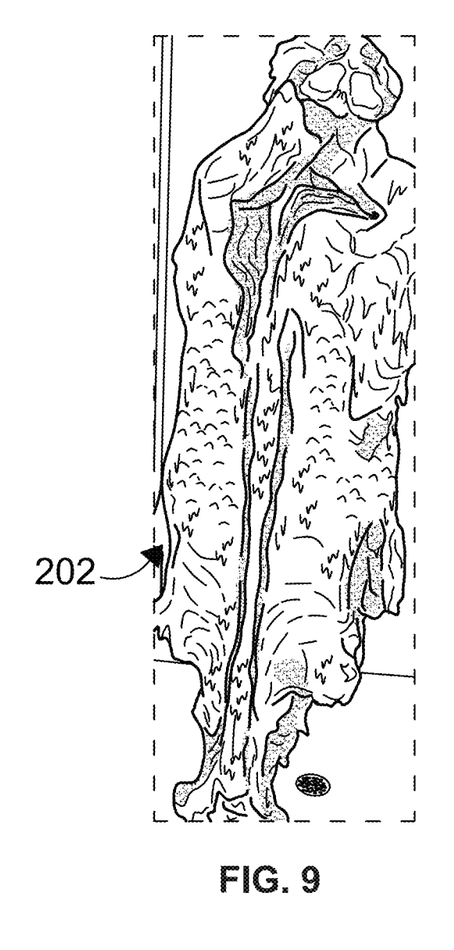
FIG. 9 is a rear perspective view of a beef carcass that has been scored down its back.

Referring again to FIGS. 7 and 8, once the carcass 2 is inverted, it is supported by the hanging device 8 connected with a support structure 14. At this time, the forelegs 18 are removed from the carcass and the carcass is scored down its backbone, which is shown in FIG. 9.

As further detailed in FIG. 1, the carcass is then cooled for approximately three to four hours to an internal temperature in the range of 75 to 85 degrees Fahrenheit, though temperatures as low as 70 degrees and as high as 90 degrees are acceptable. A standard cooler known in the beef processing industry can be used to reduce the temperature, though as discussed below, the size and environment of the cooler may vary. Once the carcass reaches the desired internal temperature, it is removed from the cooler. The carcass is then ready for removal of all primal cuts. Importantly, unlike with known methods for butchering cattle, the backbone is never cut and the carcass is not split into two halves, thus removing the potential for contamination that arises when cutting through the spinal cord.

Preferably, the cooling process takes place in an environment having a relative humidity of 84-92%. This, in addition to the shortened three to four hour cooling period, results in beef shrinkage of less than 1% and in some instances as low as half of a percent. This is an important improvement over the industry standard of 2% shrinkage, resulting in more high quality beef.

Figure 10:
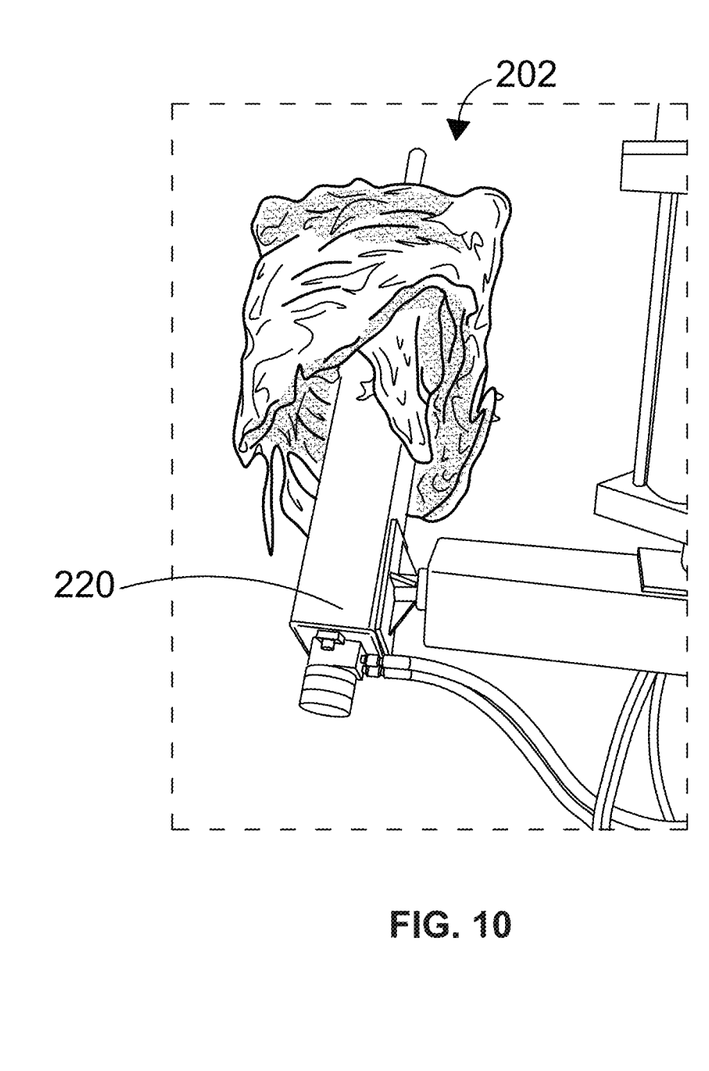
FIG. 10 is a perspective view of a beef carcass arranged on a butchering device.

Referring now to FIG. 10, the carcass 2 is arranged on a butchering device 20 such as the device described in the '838 Hendrix application, which is used to maneuver the carcass while removing the primal cuts. The apparatus allows for varying the height and position of the carcass, making the butchering process easier on butchers as compared to other known methods and devices. Moreover, the device does not require the back or sternum to be split, again reducing the potential for contamination as a result of such practices.

Once the carcass is arranged on the device, the primal cuts are removed, which is completed in 40-50 minutes due to the ease of butchering with the device. The primal cuts are then packaged and cooled for approximately 60 minutes until an internal temperature of each primal cut reaches approximately 32 to 34 degrees Fahrenheit. From there, the packaged cuts are prepared for shipping. This entire process from eviscerating the cattle to removing, packaging and cooling the primal cuts is completed in approximately 24 hours, well below the industry standard of 3 to 4 days.

As noted above, removing primal cuts when the carcass reaches a temperature of 75-85 degrees Fahrenheit, as opposed to the industry standard of 44 degrees, significantly reduces the time from kill floor to butchering and packaging. This in turn reduces the potential for pathogens or otherwise harmful bacteria to grow. Butchering beef at a higher temperature is also better for butchers. Removing primal cuts is a difficult task that places a lot of stress on butchers. By butchering at a higher temperature than is standard in the industry, less effort is required for each cut and thus conditions associated with butchering cattle, such as carpel tunnel syndrome, are reduced.

Producing beef with this method is also beneficial to the quality of the meat. As noted above, there is less of a chance of contamination, but also the beef will be of a better quality over beef produced through other methods that often require at least 24 hours of cooling prior to butchering and have a total production time of 3 to 4 days. Because of the decreased cooling time of this method, the resulting meat will be more tender, it will better retain its natural juices and enzymes, and have a shelf life that is approximately two days longer than other methods. Also, as noted above, the rate of shrinkage will be decreased significantly.

A further benefit of the present method is the reduction of energy needed to produce beef, which in turn will reduce costs and lessen the environmental impact of processing plants that use this method. The reduction of energy results from the shorter time required to cool a carcass prior to removing primal cuts and the overall reduction in time from kill floor to packaging. Moreover, by removing primal cuts prior to lowering beef temperatures to 32-34 degrees Fahrenheit, the size of a cooler for the final stage of cooling prior to packaging can be reduced. For known methods wherein full cattle carcasses are hung in coolers for at least 24 hours until they reach 44 degrees Fahrenheit, a greater number of large coolers, often having a height of approximately 14 feet, are needed to house the many cooling carcasses. For the present method, due to the shorter initial cooling period, a lesser number of large coolers are needed, and for coolers used to reduce the temperature of primal cuts, the size of the cooler can be reduced to approximately 9 feet. Reducing the total number of large coolers and reducing the size of coolers for primal cuts reduces energy usage which in turn provides cost savings and lessens the environmental impact of processing plants.

Although the above description references particular embodiments, it is to be understood that these embodiments are merely illustrative of the principles and applications of the present disclosure. It is therefore to be understood that numerous modifications may be made to the illustrative embodiments and that other arrangements may be devised and employed without departing from the spirit and scope of the present disclosure.

What is claimed is:

1. A method for processing beef, comprising the steps of:
   (a) preparing a beef carcass for butchering without splitting the backbone or sternum including removing the carcass head, eviscerating the carcass, and scoring the carcass down its backbone without cutting through the carcass spine;
   (b) arranging the carcass on a butchering device and removing primal cuts from the carcass without splitting the backbone or sternum, wherein the primal cuts are removed when the carcass is at a temperature of no less than 70 degrees Fahrenheit;
   (c) packaging the primal cuts; and
   (d) cooling the primal cuts for 50-70 minutes to an internal temperature of 32-38 degrees Fahrenheit for each primal cut.

2. A method for processing beef as defined in claim 1, and further comprising the step of cooling the carcass for at least three hours to a carcass internal temperature of 90 degrees Fahrenheit, wherein processing of a beef carcass from initial slaughter to packaging primal cuts and then cooling the packaged primal cuts is complete within 24 hours.

3. A method for processing beef as defined in claim 2, wherein cooling the carcass and cooling the primal cuts is performed in an environment having a humidity of 84-92 percent.

4. A method for processing beef, comprising the steps of:
   (a) preparing a beef carcass for butchering including:
      (1) hanging the carcass by a carcass hind portion, removing the carcass head, eviscerating the carcass and removing the carcass hind legs;
      (2) inserting a hanging device through an opening in the carcass neck;
      (3) inverting the carcass to hang from the hanging device through the carcass neck; and
      (4) removing the forelegs from the carcass;
   (b) cooling the carcass for at least three hours;
   (c) arranging the carcass on a butchering device and removing primal cuts from the carcass;
   (d) packaging the primal cuts; and
   (e) cooling the primal cuts for 50-70 minutes to an internal temperature of 32-38 degrees Fahrenheit for each primal cut, wherein processing of a beef carcass from initial slaughter to packaging primal cuts and then cooling the packaged primal cuts is complete within 24 hours.

5. A method for processing beef as defined in claim 4, wherein said hanging the carcass by a carcass hind portion includes hanging the carcass by an opening in the carcass pelvic bone.

6. A method for processing beef as defined in claim 5, wherein said inserting a hanging device step includes inserting an inverted hanging device through an opening in the carcass neck.

7. A method for processing beef, comprising the steps of:
(a) preparing a beef carcass for butchering including hanging the carcass by a hind portion, removing the carcass head, eviscerating the carcass, removing the carcass hind legs, inverting the carcass, and removing the carcass fore legs;
(b) arranging the carcass on a butchering device and removing primal cuts from the carcass;
(c) packaging the primal cuts; and
(d) cooling the primal cuts for 50-70 minutes to an internal temperature of 32-38 degrees Fahrenheit for each primal cut.

8. A method for processing beef as defined in claim 7, and further comprising the step of cooling the carcass for at least three hours to a carcass internal temperature of 70-90 degrees Fahrenheit, wherein processing of a beef carcass from initial slaughter to packaging primal cuts and then cooling the packaged primal cuts is complete within 24 hours.

9. A method for processing beef as defined in claim 8, wherein the beef carcass is prepared for butchering without splitting the backbone or sternum.

\* \* \* \* \*